(12) United States Patent
O'Connor

(10) Patent No.: US 7,216,883 B2
(45) Date of Patent: May 15, 2007

(54) BICYCLE WITH REAR SUSPENSION

(75) Inventor: D'Arcy O'Connor, Vancouver (CA)

(73) Assignee: Rocky Mountain Bicycles-a division of Procycle Group Inc., Delta, British Columbia (CA)

( * ) Notice: Subject to any disclaimer, the term of this patent is extended or adjusted under 35 U.S.C. 154(b) by 0 days.

(21) Appl. No.: 11/069,568

(22) Filed: Mar. 2, 2005

(65) Prior Publication Data

US 2006/0197306 A1   Sep. 7, 2006

(51) Int. Cl.
*B62K 19/30* (2006.01)

(52) U.S. Cl. ............... 280/284; 280/275; 280/283

(58) Field of Classification Search ............ 280/284, 280/275, 283
See application file for complete search history.

(56) References Cited

U.S. PATENT DOCUMENTS

| | | | |
|---|---|---|---|
| 625,456 | A | 5/1899 | Mills et al. |
| 944,795 | A | 12/1909 | Leet et al. |
| 4,671,525 | A | 6/1987 | Ribi |
| 5,295,702 | A | 3/1994 | Buell et al. |
| 5,306,036 | A | 4/1994 | Busby et al. |
| 5,335,929 | A * | 8/1994 | Takagaki et al. ........... 280/283 |
| 5,354,085 | A * | 10/1994 | Gally ........................ 280/285 |
| 5,356,165 | A | 10/1994 | Kulhawik et al. |
| 5,452,910 | A | 9/1995 | Harris |
| 5,553,881 | A | 9/1996 | Klassen et al. |
| 5,628,524 | A | 5/1997 | Klassen et al. |
| 5,957,473 | A * | 9/1999 | Lawwill ..................... 280/284 |
| 6,056,307 | A * | 5/2000 | Busby et al. ............... 280/284 |
| 6,102,421 | A * | 8/2000 | Lawwill et al. ............ 280/284 |
| 6,199,886 | B1 | 3/2001 | Guenther |
| 6,206,397 | B1 | 3/2001 | Klassen et al. |
| 6,439,593 | B1 | 8/2002 | Tseng |
| 6,488,301 | B2 * | 12/2002 | Klassen et al. ............. 280/284 |
| 6,843,494 | B2 * | 1/2005 | Lam ........................... 280/284 |
| 6,880,847 | B2 * | 4/2005 | Chamberlain et al. ...... 280/284 |

FOREIGN PATENT DOCUMENTS

| | | |
|---|---|---|
| CA | 2168064 | 7/1996 |
| CA | 2265336 | 9/1999 |
| DE | 296 21 165 | 2/1997 |
| DE | 297 16 292 | 1/1998 |
| EP | 0 399 615 | 11/1990 |
| EP | 0 574 613 | 12/1993 |
| EP | 0 769 447 | 4/1997 |
| EP | 0 827 902 | 11/1998 |
| JP | 06 107264 | 4/1994 |
| JP | 06 115477 | 4/1994 |
| WO | WO-99/44880 | 9/1999 |

* cited by examiner

*Primary Examiner*—Lesley D. Morris
*Assistant Examiner*—Marlon Arce-Diaz
(74) *Attorney, Agent, or Firm*—Ogilvy Renault LLP

(57) ABSTRACT

A bicycle frame set comprising a main frame and a rear wheel suspension system. The rear wheel suspension system comprises a first link member with an upper end pivotally connected to a seat tube of the main frame at a link pivot point located rearward of an axis extending between a bottom bracket of the main frame and an intersection of the seat tube and a top tube of the main frame. The first link member has a displaceable lower end pivotable about the link pivot point. The swing-arm is pivotally interconnected with the main frame proximate the bottom bracket and has a rearward end adapted to engage a rear wheel axle. The swing-arm is pivotally connected with the first link member at a point thereon intermediate the upper and lower ends. A shock absorber is affixed between the main frame and the lower end of the first link member.

21 Claims, 11 Drawing Sheets

BICYCLE WITH REAR SUSPENSION

CROSS-REFERENCE TO RELATED APPLICATIONS

This is the first application filed for the present invention.

TECHNICAL FIELD

The present invention relates generally to two-wheeled vehicles, particularly bicycles, and more specifically to a rear wheel suspension for such vehicles.

BACKGROUND OF THE INVENTION

Rear wheel suspension systems have been used on a variety of two-wheeled vehicles, including motorcycles, scooters and bicycles, for providing improved rider comfort and increased performance.

Rear wheel suspensions on pedal powered bicycles have become increasingly popular, and generally provide a rider with the benefits of a more comfortable ride and better control over the bicycle. Such bicycle suspension systems improve ride quality by absorbing the shocks incurred from encountering ground obstacles, rather than transmitting them through the frame to the rider. By maintaining greater contact between the tire and the ground, the suspension also provides the rider with better control for accelerating, braking, and cornering.

For a suspension to be suitable for use on a bicycle, it must be efficient. Ideally, a perfect rear wheel suspension would compress only in reaction to ground forces but not to drive-train or braking forces. Unwanted suspension movement resulting from drive train forces wastes rider energy. Bicycle suspensions can be designed to react principally to ground forces, and such that drive-train and braking forces which act thereon are limited, by careful selection of suspension type and geometry.

Several types of rear wheel suspensions exist. One of these suspension systems comprises attaching the rear axle directly to a swing-arm which pivots around a single fixed pivot axis on the forward main frame. In such a system, the pivot point around which the rear wheel axle rotates is simply the pivot point at which the swing-arm is attached to the frame. This type of suspension benefits from being simple and, if the single fixed pivot is correctly placed and the suspension geometry is correctly chosen, this type of suspension can be effective. However, the possible locations for the main pivot are often limited by traditional frame geometry and by the necessity for mounting other components such as the shock absorber and the front derailleur.

Another type of suspension system which is currently growing in popularity, and which enables a rear wheel travel path which defines a quadratic trajectory, comprises a four-bar linkage in which two different linkages or pairs of linkages are attached to the main frame of the bicycle. A third member, to which is attached the rear axle, is engaged with each of these two linkages. In such a four-bar linkage suspension, the center of rotation of the rear axle is not fixed, as in the fixed pivot axis suspensions, and varies with the relative position of the linkages. Thus, as the suspension moves, the instantaneous center of rotation changes. Such a variable pivot point (VPP) system accordingly allows for a non-constant rate of change between the rear wheel axle and the bottom bracket of the main frame portion.

Both of the above types of suspensions have their advantages, however most known suspension designs of either type have associated disadvantages. For example, known single/fixed pivot rear suspensions generally require the shock absorber for the single pivot swing arm to be located relatively high in the main frame of the bicycle and therefore result in a relatively high overall center of gravity of the bicycle. This is disadvantageous in many bicycling applications, particularly when covering steep or mountainous terrain. Further, traditional single pivot suspensions assemblies often have a suspension structure with a center of mass which is off-center relative to the bottom bracket of the frame, resulting in fore-aft weight imbalances. Such weight imbalances can result in reduced maneuverability of the bicycle.

There exists therefore a need for an improved bicycle rear suspension which addresses at least some of the forgoing problems with known designs.

SUMMARY OF THE INVENTION

It is therefore an object of the present invention to provide an improved bicycle having a rear suspension system.

Therefore, in accordance with one aspect of the present invention, there is provided a rear wheel suspension system for a bicycle having a frame with a bottom bracket, a seat tube, a top tube and a down tube, the suspension system comprising: upper and lower pivots adapted to be fixed to said frame at two spaced apart points thereon, said upper pivot being disposed on said seat tube rearward of a first reference axis extending between said bottom bracket and an intersection between said seat tube and said top tube, said lower pivot being disposed proximate said bottom bracket; a first link member having an upper end pivotally connected to said upper pivot and a displaceable lower end pivotable about said upper pivot; a swing-arm having a forward end pivotally connected with said lower pivot, said swing-arm having a wheel mounting bracket at a rear end thereof for receiving a rear wheel axle, said swing-arm being pivotally connected with said first link member at a point thereon intermediate said upper and lower ends; and a shock absorber having a first end pivotally connected to said displaceable lower end of said first link member and a second end adapted for connection with said frame.

There is also provided, in accordance with another aspect of the present invention, a bicycle frame set comprising: a main frame including at least a seat tube, a top tube, a head tube, and a down tube having a bottom bracket affixed thereto; and a rear wheel suspension system pivotally attached to said main frame at two spaced apart locations, said rear wheel suspension system comprising: a first link member having an upper end pivotally connected to said seat tube of said main frame at a link pivot point located at least rearward of a first reference axis extending through said bottom bracket and an intersection of said seat tube and said top tube, said first link member having a displaceable lower end pivotable about said link pivot point; a swing-arm having a forward end pivotally interconnected with said main frame proximate said bottom bracket thereof at a lower pivot point, and a rearward end thereof having a mounting member adapted for engaging a rear wheel axle thereto, said swing-arm being pivotally connected with said first link member at a point thereon intermediate said upper and lower ends; and a shock absorber affixed between said main frame and said lower end of said first link member.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENTS

Figure 1:
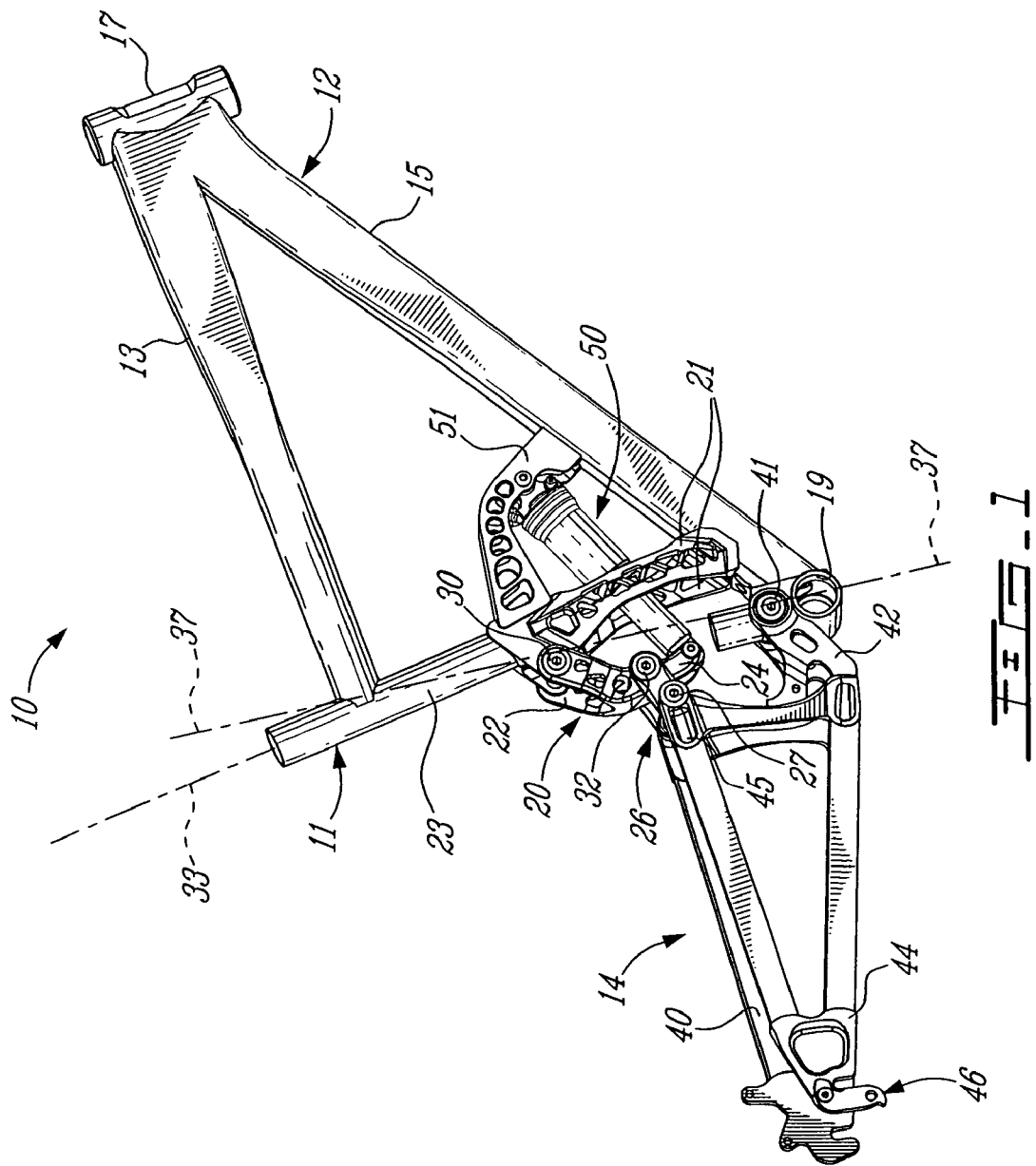
FIG. 1 is a perspective view of a bicycle frame set in accordance with one embodiment of the present invention, having a fixed pivot rear suspension system.

The frame set of the present invention includes a rear wheel suspension system which can be used on a variety of two-wheeled vehicles such as motorcycles, scooters and bicycles, and generally provides improved rider comfort and increased performance by maintaining improved contact between the rear wheel of the vehicle and the ground. Although the present invention will be described herein with particular reference to its use as a bicycle frame set, it is to be understood that the present invention can be employed on any such two-wheeled vehicle.

As suspension systems become more and more commonplace on bicycles, and particularly mountain bicycles, designs continue to evolve to fulfill the growing needs of avid bicycle enthusiasts. Two growing niches in the mountain biking field are downhill and so called freeride applications, and more particularly, enduro-downhill racing which is also increasing in popularity. For such applications, it is desirable to have a relatively large amount of suspension travel, while maintaining a bike which is relatively lightweight and allows good control for the rider during extended periods of time. Although the bicycle frame sets 10 and 60 of the present invention have generally evolved from the need for such a bicycle, it is to be understood however that the present frame sets can be used for a bicycle or other two-wheeled vehicle of any type and for any particular application.

The bicycle frame sets 10 and 60 have a particularly low center of gravity, resulting largely from the shock placement generally above the bottom bracket of the frame such that the shock absorber, the heaviest frame component, is located low on the bike frame and substantially centralized in the fore-aft direction.

The suspension geometry of the embodiments of the present invention helps to maintain pedaling efficiency while limiting so-called "brake jack" and "suspension bob". Brake jack is an undesirable condition in which the suspension is compressed by braking forces on the rear wheel, while suspension bob is equally undesirable and results when drive train forces, such as those caused by pedaling, compress the suspension and thus reduce the amount of pedaling forces being transferred to the rear wheel for propelling the bicycle forward. The efficiency of the suspension system is generally a measure of the system's ability to absorb energy transferred, into the bicycle when the wheels thereof encounter irregularities in the ground surface and to damp out vibrations of the bicycle frame which may be induced by such ground irregularities. However, as noted above suspension systems can also absorb energy from the vehicles drive train, such as by braking forces and motive forces. Lost energy can therefore be caused by drive train forces which compress the suspension system rather than being transferred directly to the rear wheel via the drive train for the purpose of making the bicycle go forward. Generally, the ratio of the energy transferred to the bicycle from encountering the irregularities in the ground surface absorbed by the vehicle suspension to the total energy absorbed by the suspension system may be termed the efficiency of the suspension system. Accordingly, an efficient suspension system is one which absorbs as much energy from the ground as possible while absorbing as little energy from the drive train and brakes as possible. The bicycle frame sets of the present preferred embodiments attempt to limit such unwanted suspension compression caused by drive train forces and therefore seek to provide a suspension system having an improved efficiency.

Figure 2:
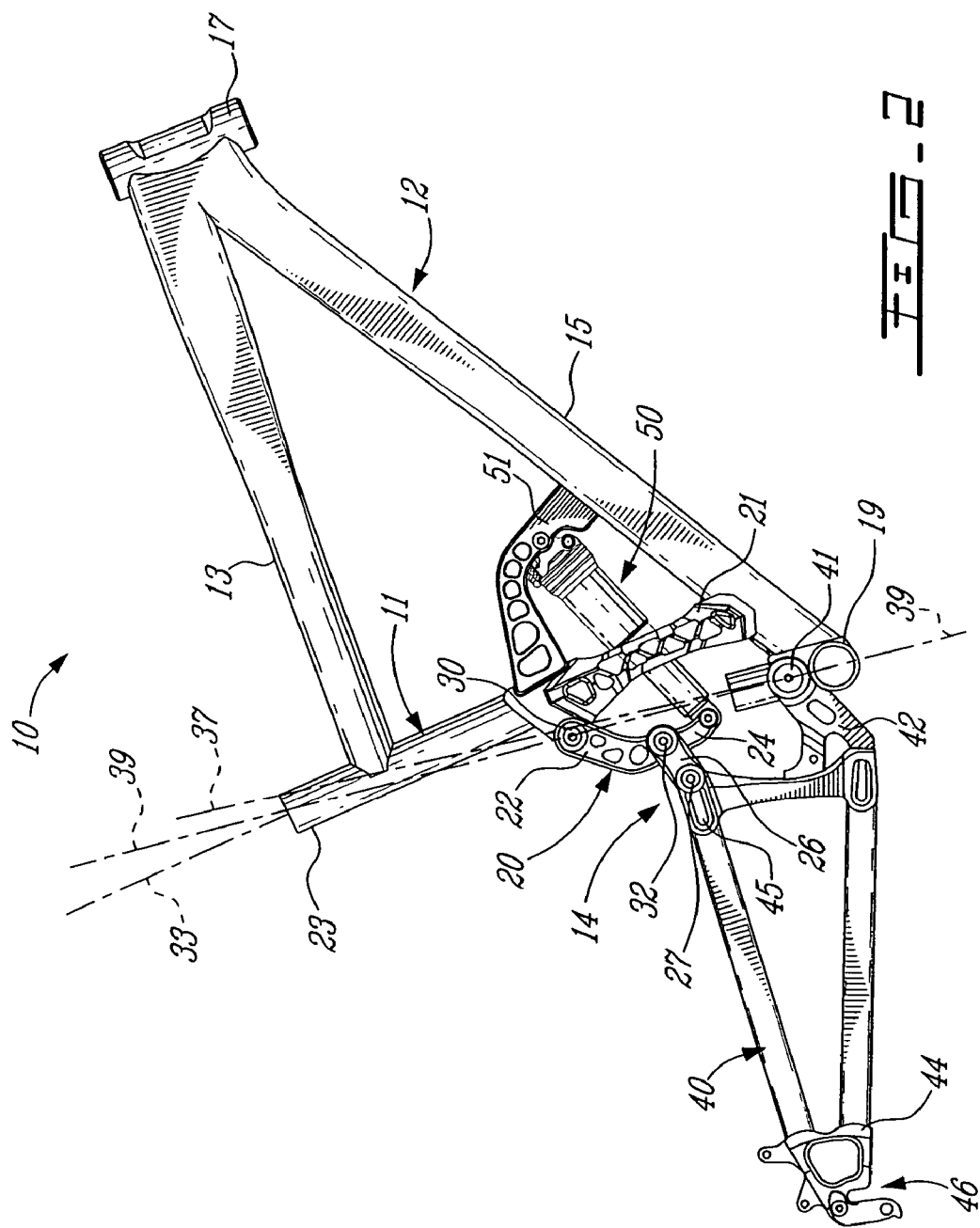
FIG. 2 is a side elevation view of the bicycle frame set of FIG. 1, shown with the rear suspension system in a neutral position.
Figure 3:
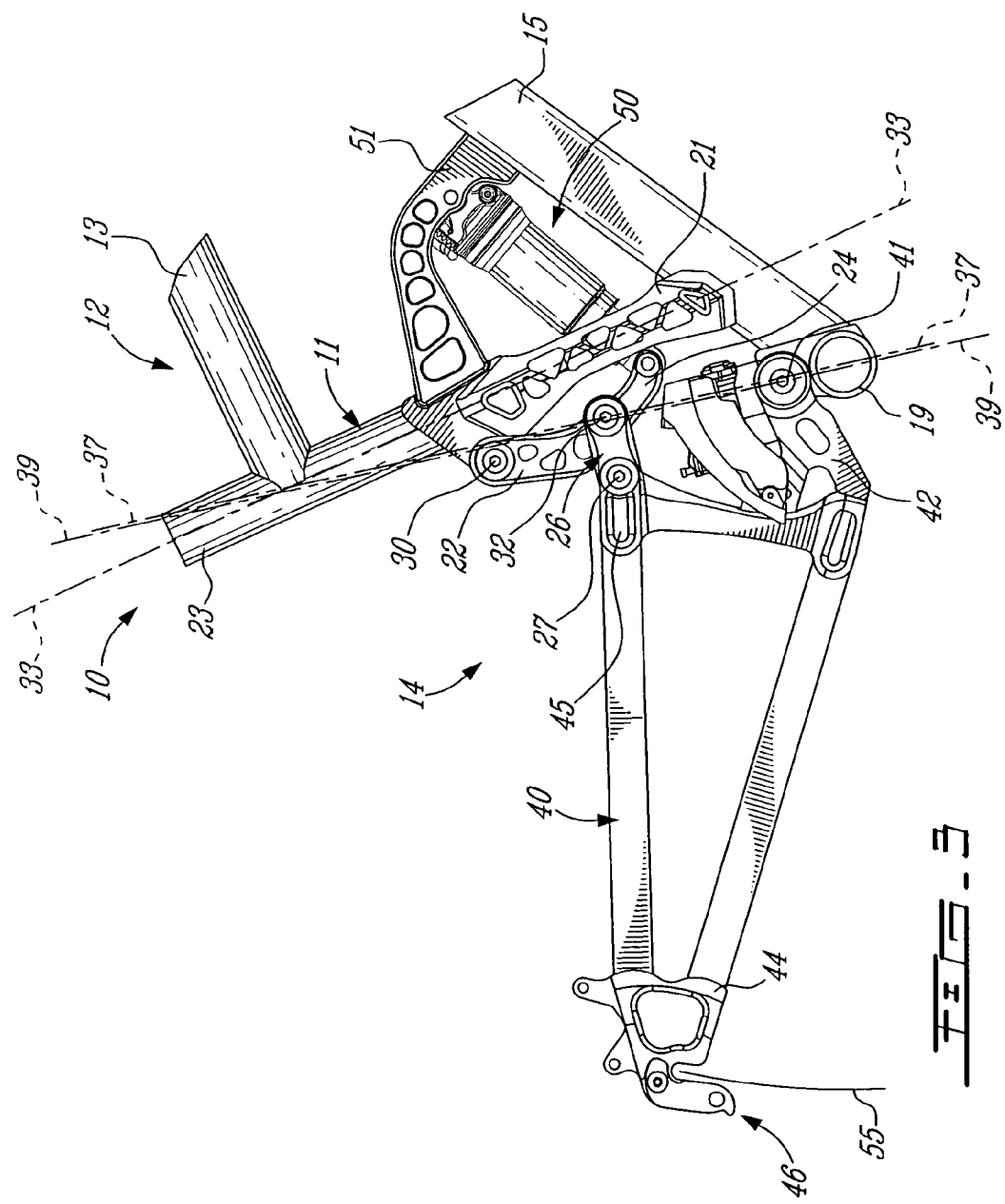
FIG. 3 is a partial side elevation view of the bicycle frame set as depicted in FIG. 2, shown with the rear suspension system is fully compressed.

Referring now to FIGS. 1–3, the bicycle frame set 10 comprises a forward main frame section 12 having generally a seat tube 11, a top tube 13, a head or steering tube 17, a down tube 15, and a bottom bracket 19 disposed at a lower end of the down tube 15. As will be discussed in further detail below, the seat tube 11 is discontinuous or interrupted. Particularly, the seat tube 11 includes an upper closed tubular portion 23 having an open upper end within which a seat post (not shown) is received, and a pair of structural support members 21 which extend between the down tube 15 and the bottom end of the upper tubular portion 23. The support members 21 define an opening therebetween which is preferably laterally aligned with a seat tube axis 33. The opening defined between the laterally spaced-apart structural support members 21 of the composite seat tube 11 is sufficiently wide to permit the shock absorber 50 to extend therethrough, such that the shock absorber 50 can be affixed between the down tube 15 and a displaceable lower end 24 of the first suspension link member 20, as will be described in further detail below. Thus, the shock absorber 50 is thereby located relatively low on the frame and disposed in a generally centralized fore-aft position on the frame set. Preferably, the shock absorber is positioned such that each of the ends of the shock absorber 50 are disposed on opposed sides of at least the longitudinal central tube axis 33 of the seat tube 11, and more preferably on opposed sides of a first reference axis 37, at least when the suspension is in an uncompressed position as depicted in FIG. 2. The first reference axis 37 extends generally between the bottom bracket 19 and an intersection region between the top tube 13 and the seat tube 11. Alternately, a second reference axis 39 may be used, in place of the first reference axis 37, as a reference. As depicted in FIG. 2, the second reference axis 39 extends between the center of the bottom bracket 19 and the pivot axis of lower frame pivot 41, and may be extrapolated upwards as a reference line, behind which the upper frame pivot 30 is disposed and which is also straddled by the ends of the shock absorber 50 when in an uncompressed state. The second reference axis 39 extends at an angle of approximately 72 degrees relative to horizontal. Thus, a relatively low center of gravity is provided by the frame set 10, at least partly due to the low and centralized mounting position of the shock absorber 50 provided by the geometry of the frame set 10.

Referring now to the rear-wheel suspension system 14 which is pivotally attached to the main frame 12 at two spaced-apart locations by pivots 30 and 41, the suspension system 14 comprises generally a swing arm 40 and at least a first link member 20. The rear wheel suspension system 14 is said to be a single or fixed pivot suspension system, in that the rear wheel moves about an arc relative to the main frame. This provides a relatively simple system, in that the swing arm 40 is pivotally connected directly to the main frame at a single location, namely by pivot 41 disposed preferably just above the bottom bracket 19. The first link member 20 is inverted, having an upper end 22 thereof pivotally connected to the seat tube 11 of the main frame 12 by upper pivot 30 and a displaceable lower end 24 which is pivotable about the upper pivot 30 and pivotally connected to a rearward end of the shock absorber 50. The first link member 20 is pivotable about the link pivot 30 in a generally counter-clockwise direction when viewing the bike as depicted in FIG. 2. Thus, rotation of the first link member 20 about the link pivot 30, such that the displaceable lower end 24 moves in a generally forward direction relative to the main frame 12, compresses the shock absorber 50 which accordingly reacts to dampen the forces acting to compress the rear wheel suspension system 14.

The forward end of the shock absorber 50 is mounted to the down tube 15 of the main, frame 12 by a shock mounting bracket 51. Preferably, the shock mounting bracket 51 is located at a point less than half way up the down tube 15 relative to the bottom bracket 19. In other words, if the down tube 15 has an overall length "L" defined between the bottom bracket 19 and an intersection of the top tube 13 and the down tube 15, the shock absorber mounting bracket 51 is fixed to the down tube 15 a distance less than about 0.5 L from the bottom bracket.

The swing arm 40 has a lower forward end 42 which is pivotally connected with the main frame 12 by lower pivot 41 which is preferably located immediately above the bottom bracket 19. Lower pivot 41 between the main frame 12 and the swing arm 40 therefore provides a single, fixed pivot point about which the swing arm rotates. Accordingly, the rear suspension system 14 of the frame set 10 is said to be a fixed pivot or single pivot rear suspension. The swing arm 40 further includes, at a rearward end 44 thereof, a wheel mounting member 46 for receiving and engaging a rear wheel axle. Although the mounting member 46 is generally depicted as a quick-release drop-out type axle engagement, it is to be understood that a standard fixed axle wheel mounting assembly may also be used.

An upper and forward end 45 of the swing arm 40 is pivotally interconnected to the first link member 20 at a point of the first link member intermediate the upper end 22 and the lower end 24. More particularly, the upper end 45 of the swing arm 40 is engaged with the first link member 20 via an intermediate lower link 26, which is pivotally connected to the upper end 45 of the swing arm 40 at pivot point 27 and pivotally connected to said intermediate point of the first link member 20 at pivot point 32. Thus the swing arm 40 acts on the first link member 20 via the intermediate lower link 26, which is pivotally engaged between the swing arm 40 and first link member 20.

As noted above, the first link member 20 of the rear suspension system 14 is pivotally connected to the seat tube 11 of the main frame 12 by pivot 30 which is located rearward (i.e. relative to the riding direction of the bicycle) of at least the second reference axis 39, which intersects the center of the bottom bracket 19 and the central pivot axis of the lower frame pivot.41. More preferably, the pivot 30 is disposed rearward of the first reference axis 37, which extends between the bottom bracket 19 and an intersection region between the seat tube 11 and the top tube 13 of the main frame 12. This helps to place the shock absorber 50 relatively low and centralized in the frame, resulting in a low and centralized center of gravity. Thus, either end of the shock absorber 50 is disposed at least on opposed sides of the central axis 33 of the seat tube 11. At least in the neutral (i.e. uncompressed) position of the suspension system 14 as depicted in FIG. 2, these opposed ends of the shock absorber 50 are also at least located on opposed sides of the second reference axis 39, and more preferably on opposed sides of the first reference axis 37.

The frame set 10 therefore achieves an overall low center of gravity by having a configuration which permits the shock absorber 50 to be roughly centered above the bottom bracket 19, thus keeping this relatively heavy frame component low and centralized in a fore-aft direction on the bicycle. At least one of the inverted first link member 20, the single pivot mounted swing arm 40, and the interrupted seat tube 11 of the main frame 12 which defines an opening therethrough at a lower end thereof which is aligned with the longitudinal axis of the seat tube and through which the shock absorber extends, helps to enable such a shock position relative to the frame set, thereby resulting in a relatively low center of gravity. Swing arm stiffness is also improved by interconnecting the swing arm 40 to the main frame 12 at two spaced-apart locations, namely through the main swing arm pivot 41 and, via the first link member 20, to the upper pivot 30.

As the rear wheel swing arm 40 of the suspension system 14 pivots relative to the main frame at a single, fixed pivot point 41, the rear wheel mounting member 46, and therefore the rear wheel axle engaged thereto, is displaced along an arc 55 (see FIG. 3) having a center of rotation at the axis of the swing arm pivot 41. As such, the center of rotation of the swing arm 40 remains fixed and the radius of rotation remains constant throughout the rear wheel travel path. As the center of rotation of the swing arm 40, and therefore the rear wheel axle engaged thereto, is fixed and centered at the main pivot point 41, both the chain force vectors and brake force vectors, which respectively tend to create pedal-induced suspension bob and brake jack, pass very close to the main pivot axis extending through pivot 41 throughout the entire progression of the rear suspension travel. This helps minimize the effects of said pedal-induced suspension bob and brake jack.

Figure 4:
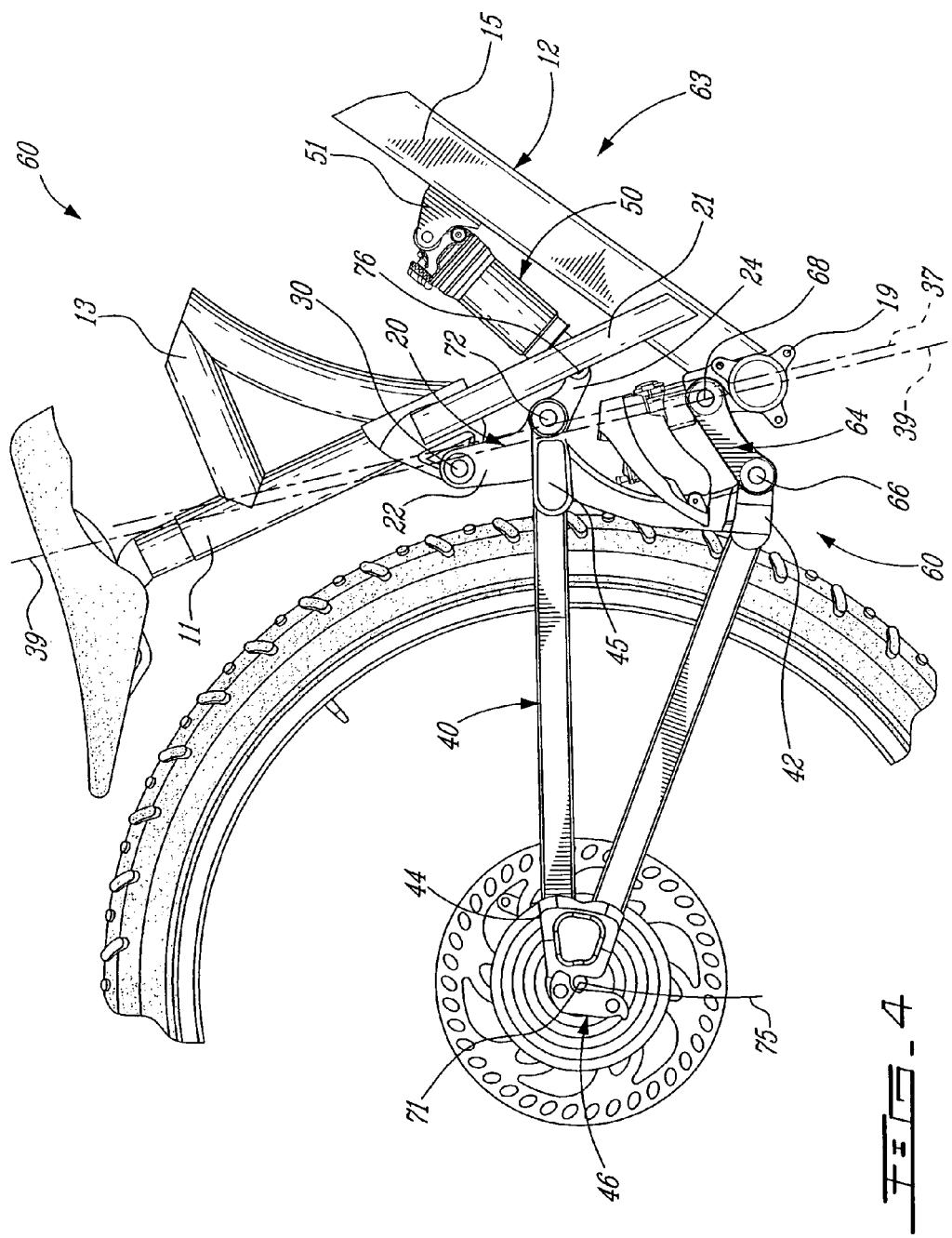
FIG. 4 is a partial side elevation view of a bicycle in accordance with another embodiment of the present invention which includes a four-bar rear suspension system having a displacing virtual pivot point.

Referring now to FIG. 4, the bicycle 60 comprises a frame set 63 in accordance with a second embodiment of the present invention, which includes a main frame portion 12 as per the frame set 10 described above, and a rear wheel suspension system 60. In comparison with the rear wheel suspension system 14 of FIGS. 1–3, which is a single or fixed pivot design, the suspension system 60 is a four-bar style suspension which permits the location of the center of rotation of the rear wheel axle to be varied over the path through which said axle travels during the compression of the suspension system. Further, the four-bar suspension system 60 provides inherent stiffness as a result of the interconnection of the swing-arm 40 with the main frame 12 by the two intermediate pivoting link members 20 and 64, as will be described in greater detail below. Thus, for such a four-bar linkage suspension system 60, the center rotation of the rear wheel mounting member 46 on the swing arm 40, and therefore the rear wheel axle engaged thereto, is not fixed but rather varies with the position of the linkages as a function of the position of the rear wheel axle. The geometry of the path through which the rear wheel axle travels as the suspension system is compressed is generally defined by the location of the instantaneous center of rotation (ICR) of the swing-arm 40. Specifically, the ICR about which the rear wheel axle rotates at any moment in time is located at the intersection of two imaginary lines, each extending through each of the two pivot points associated with each of the first top link member 20 and the lower link member 64. Therefore as the suspension system moves, the ICR changes, unlike the fixed single pivot suspension system 14 described above. The rear wheel axle engaged to the swing arm 40 thereby travels along a quadratic rear wheel travel path, which corresponds to the locus of instantaneous centers of rotation defining a matching ICR travel path.

The rear wheel suspension system 60 includes a swing arm 40 pivotally connected to the main frame 12 via two intermediary links, namely first or top link member 20 and the lower link member 64, which rotate in opposite directions as the suspension system 60 compresses. Lower link member 64 has a first end which is pivotally engaged to the main frame 12 at a pivot point 68 immediately above the bottom bracket 19, and an opposite end pivotally connected to the swing arm 40 by rear pivot point 66. The upper forward end 45 of the swing arm 40 is pivotally connected to the first link member 20 at pivot 72, which is disposed on the first link member 20 between an upper end 22 thereof and a displaceable lower end 24 which is pivotally connected to one end of the shock absorber 50 by pivot 76. The upper end 22 of the first link member 20 is pivotally connected to the seat tube 11 of the main frame by pivot 30. The other end of the shock absorber 50 is fixed to the down tube 15 of the main frame by shock mounting bracket 51. As noted above with respect to the frame set 10, the mounting bracket 51 is fixed to the down tube 15 a distance away from the bottom bracket 19 preferably less than half of the total length of the down tube.

By using the first link member 20 and the lower link member 64 to connect the swing arm 40 to the main frame 12, the rear suspension system 60 created is a four-bar style suspension system with a non-fixed center of rotation. Such a linkage is referred to as a virtual pivot point (VPP) suspension system. The rearward end 44 of the swing arm 40 includes the mounting member 46 which receives and retains in place the rear wheel axle 71. The instantaneous center of rotation of the mounting member 46, and therefore of the rear wheel axle 71 engaged thereto, at any given position of the upper and lower link members 20,64 is located at the intersection of two imaginary lines which extend through the pivot points on each end of each link member, namely through pivots 30 and 76 of the first link member and through pivots 66 and 68 of the lower link member 64. The intersection of these two lines creates an instantaneous center of rotation of the rear wheel axle 71, thus creating a rear wheel travel path 75 which defines a variable radius of curvature relative to the main frame 12. Thus chain length or chain stay length (CSL) variations during the compression of the suspension system can be accommodated. The chain stay length is generally the distance between a crank axis of rotation, passing through the bottom bracket 19, and a rear wheel axis of rotation, passing through the rear wheel axle 71.

Figure 5:
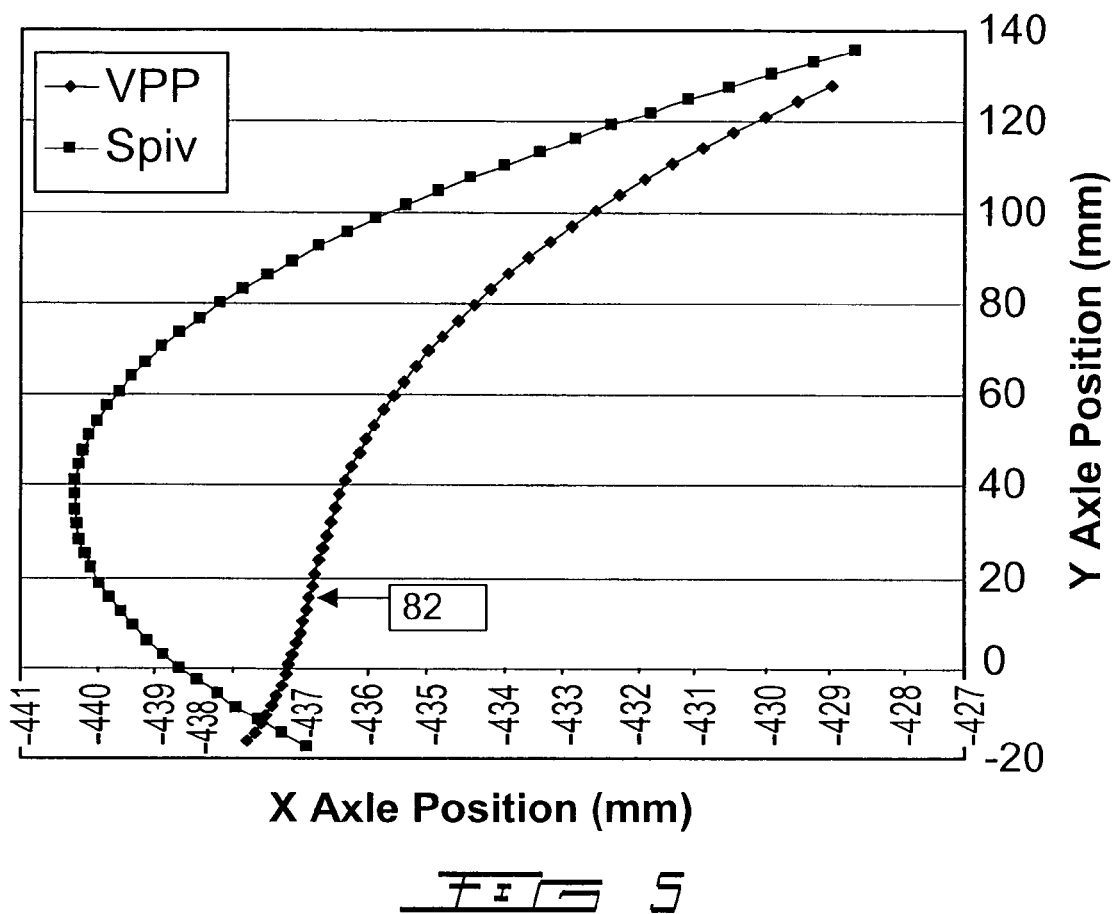
FIG. 5 is a graph plotting the rear wheel trajectories for each of the first and second embodiments of the present invention.

Referring now to FIGS. 5–11, the characteristics of both the fixed or single pivot rear wheel suspension system 14 (indicated on the graphs by "Spiv") and the four-bar type rear wheel suspension system 60 (indicated on the graphs by "VPP") will be described in greater detail. FIG. 5 depicts the trajectory of the rear wheel axle, and therefore of the rear wheel, for each of the two above-described embodiments of the present invention. Particularly, the X,Y trajectory of the rear wheel of the single pivot suspension system 14 moves along a perfect arc, as it rotates about the pivot point 41 between the swing arm 40 and the main frame 12. Thus, as the suspension compresses the rear wheel moves first upward and rearward, before moving forward back toward the main frame after the Y coordinate of the axle position has passed above approximately 40 mm. As depicted in FIG. 5, the rear wheel trajectory defined by the VPP suspension system 60 travels through less of an arc and remains closer to vertical along the lower half of the rear wheel trajectory.

For the suspension system 60, the rear wheel trajectory defined by the locus of the instantaneous centers of rotation is directly related to the rear wheel trajectory, such that the VPP trajectory in fact defines the rear wheel trajectory. At each individual instantaneous center of rotation, the rear wheel effectively moves tangentially to a circle whose center is located at this instantaneous center of rotation and whose radius is a straight line from said instantaneous center of rotation to the corresponding rear wheel trajectory point.

Figure 6:
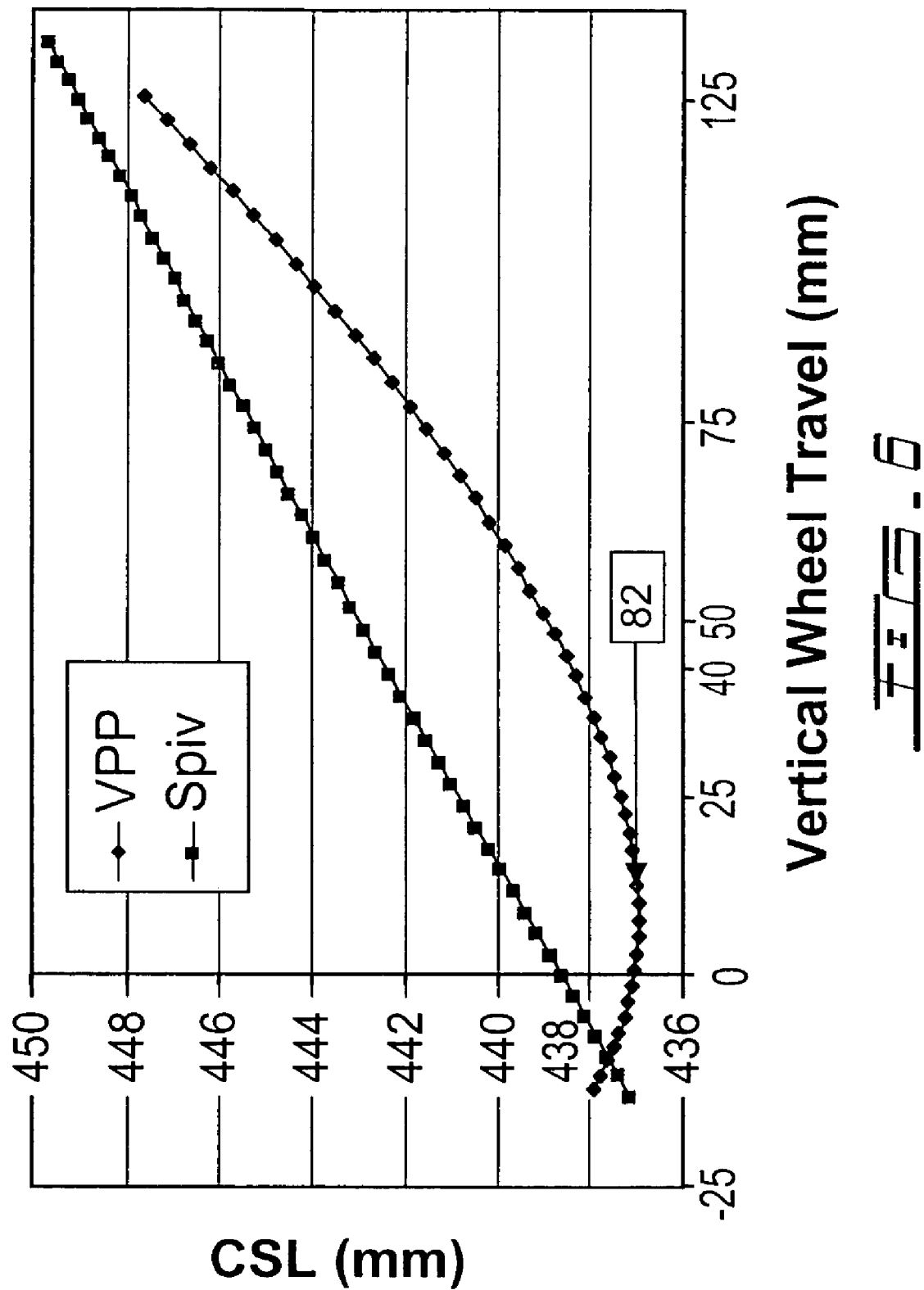
FIG. 6 is a graph plotting chainstay length vs. vertical wheel travel for each of the first and second embodiments of the present invention.

FIG. 6 depicts a graph of a plot of chain stay length (CSL) versus vertical wheel travel of both rear wheel suspension systems of the present invention. Although the graph depicts the chain stay length variation for vertical wheel travel anywhere between about −18 mm and 125 mm, the preferred pedaling region is generally anywhere between about −18 mm and 40 mm. As depicted in FIG. 6, the VPP rear wheel suspension system 60 has a relatively negligible change in chain stay length over this region, however at vertical wheel travel of greater than about 40 mm, the CSL increases at a much faster rate. This rapid increase in CSL helps to provide maximum seat tube clearance at the fully compressed position of the swing arm thereby allowing the shortest possible static chain stay length, which for the present invention is preferably about 17 inches. As depicted, the CSL for the single fixed pivot rear wheel suspension system 14 increases at a constant rate, as the rear wheel axle has a constant radius of rotation relative to the main frame pivot point. It should be noted however, that the CSL is similar at the start and the end of the vertical wheel travel paths for both the single fixed pivot rear wheel suspension 14 and the VPP rear wheel suspension system 60.

Figure 7:
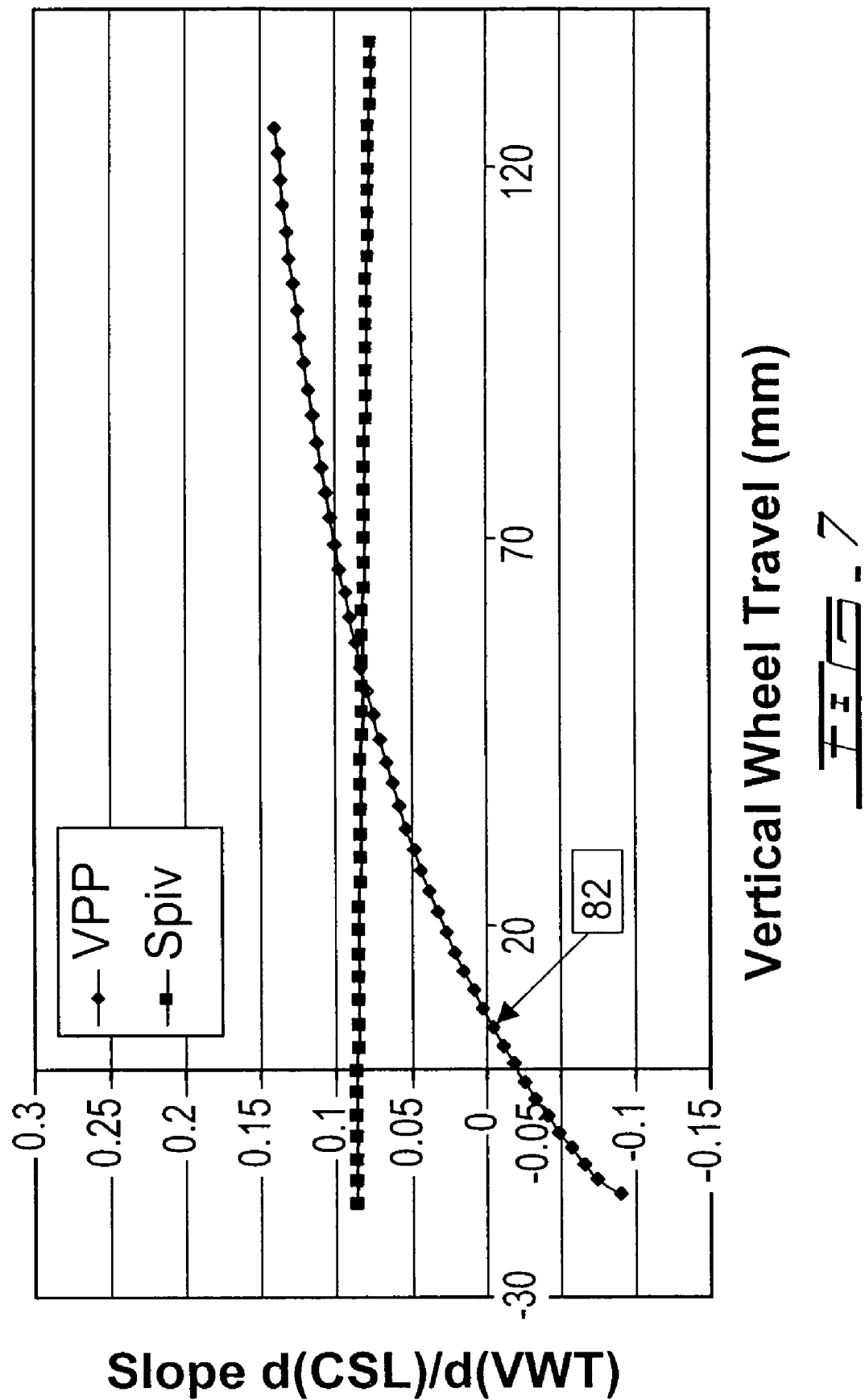
FIG. 7 is a graph plotting the first derivative of the curves of FIG. 6.

FIG. 7 depicts the first derivatives of the chain stay length versus rear wheel travel curves of FIG. 6. The first derivative of the chain stay length is equal to the slope of the CSL curve, and therefore represents the change in chain stay length with respect to the vertical wheel travel. Thus, a negative slope indicates that the CSL is decreasing while a positive slope indicates that the CSL is increasing. Therefore, as shown in the graph of FIG. 7, the first derivative of the CSL with respect to the vertical wheel travel for the single fixed pivot point rear suspension system 14 is always positive, while that of the VPP rear wheel suspension system 60 passes from negative to positive at a point which corresponds to a point of inflection (POI) on the VPP curve in FIG. 6. The point of inflection for each of the VPP curves in FIGS. 5–8 is identified by the reference number 82.

Figure 8:
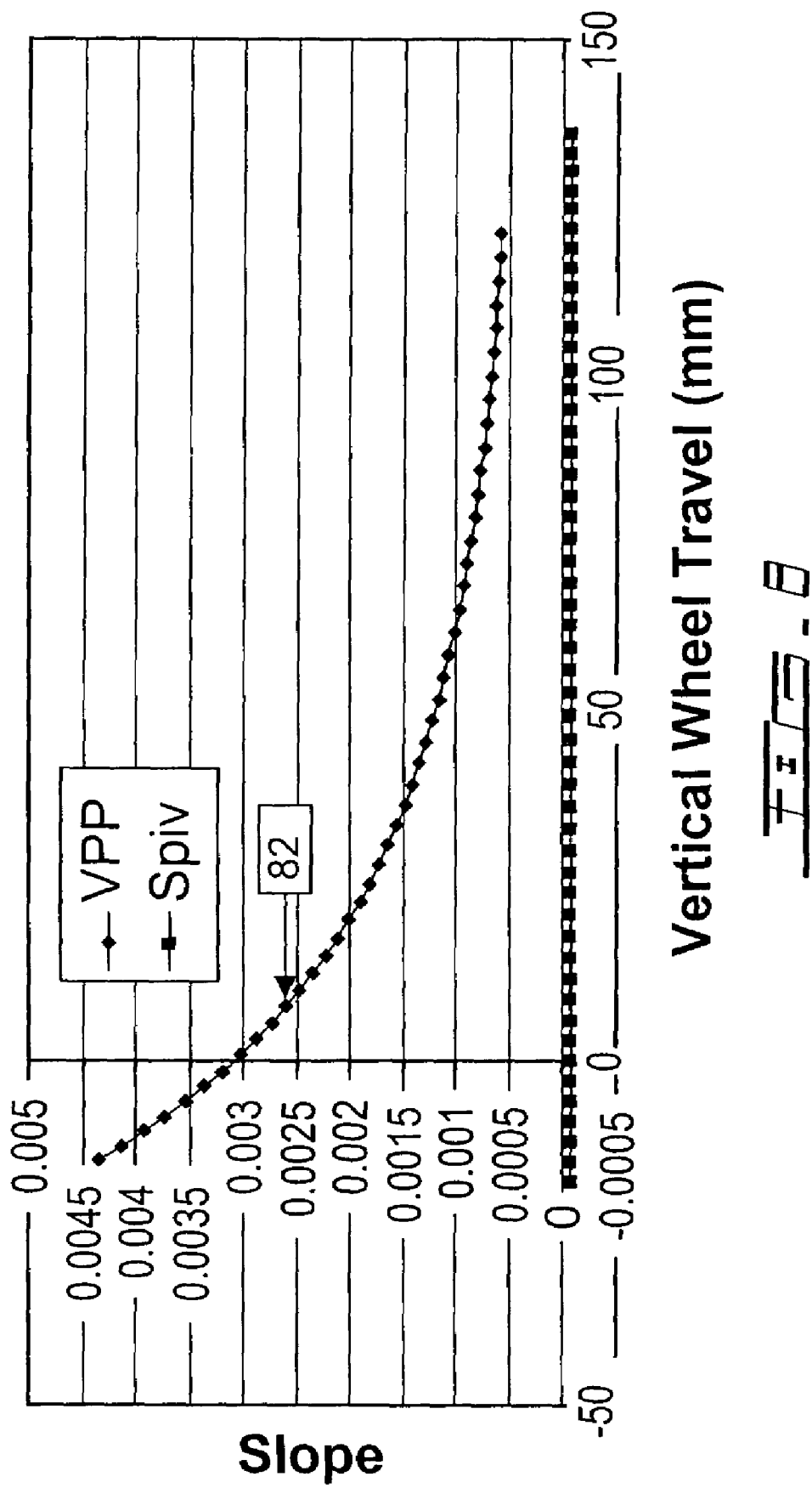
FIG. 8 is a graph plotting the second derivative of the curves of FIG. 7.

FIG. 8 shows the second derivative of the CSL versus the vertical wheel travel path of both suspension systems. These curves depict the rate at which the CSL changes as the rear wheel compresses. In other words, the farther the second derivative curve deviates from zero, the faster the CSL is changing. As can be seen from the curves of FIG. 8, the second derivative of the CSL for the single pivot rear wheel suspension system is approximately zero and therefore remains constant throughout the rear wheel travel, while the second derivative curve for the VPP rear wheel suspension system 60 varies according to rear wheel travel. Particularly, the rate at which the CSL changes for the VPP suspension system is relatively high for relatively small vertical wheel travel distances, but decreases as the vertical wheel travel distance away from a neutral position of the rear wheel increases. The second derivative relationship of the CSL curve for the VPP rear wheel suspension system 60 is accordingly positive for all points of rear wheel travel. This helps reduce pedaling feedback, thereby allowing efficient pedaling at a neutral or static position of the rear wheel suspension 60 while nevertheless maximizing tire clearance at a fully compressed position of the suspension. By maintaining a positive second derivative of the CSL for all points of rear wheel travel, an acceptable amount of chain growth (i.e. CSL increase) is maintained during the pedaling portion of the suspension travel, after which the CSL growth decreases.

Another factor which affects the characteristics and therefore the performance of a rear wheel suspension system is the inherent shock rate of the suspension design. The shock rate of any given suspension can be defined as the ratio of the amount of compression of the shock absorber relative to the rear wheel travel. Thus, the shock rate R can be expressed as:

$$R = \text{Shock Stroke (mm)/wheel travel (mm)}$$

Figure 9:
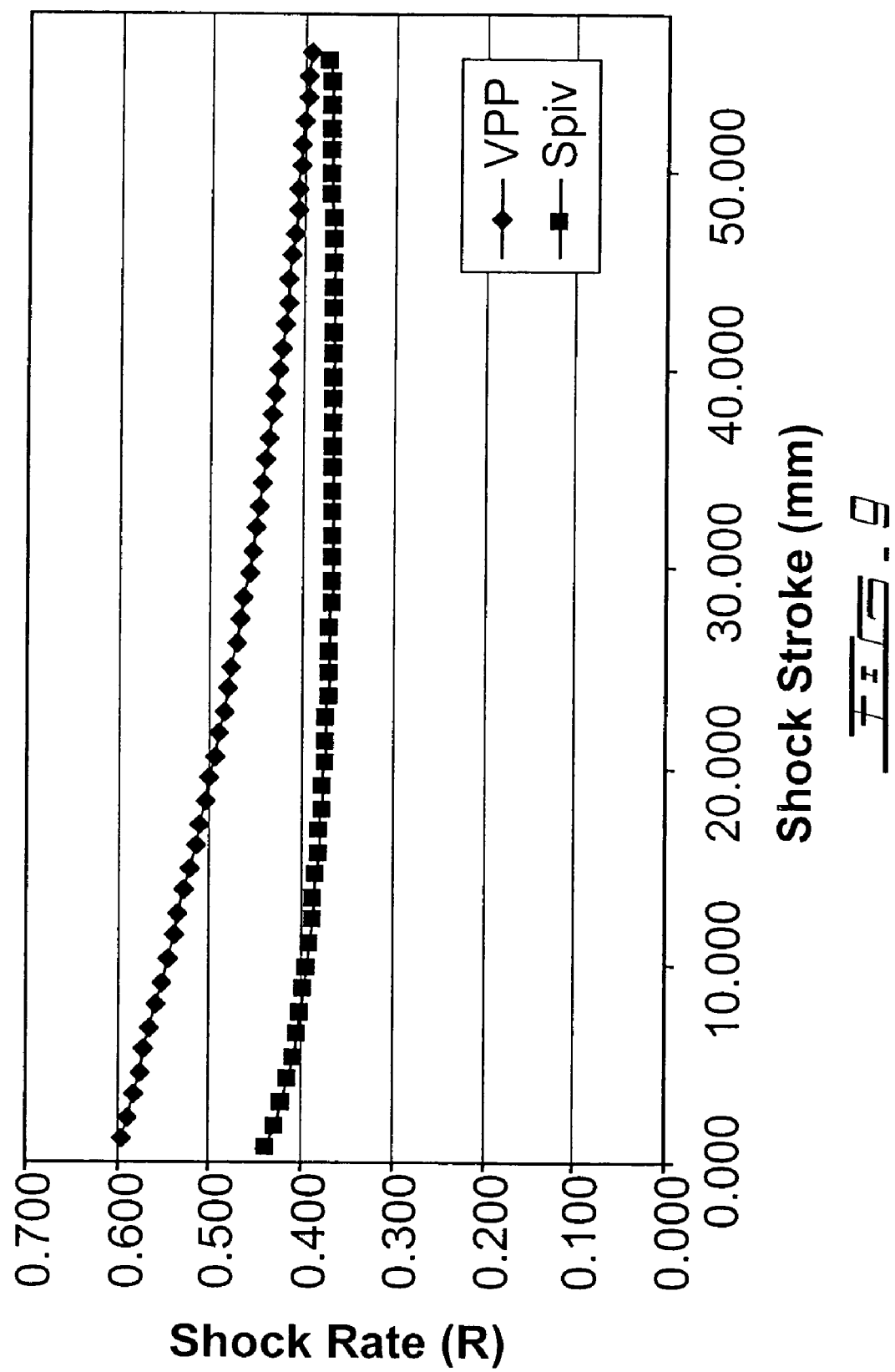
FIG. 9 is a graph plotting the suspension rate curves for each of the first and second embodiments of the present invention.
Figure 10:
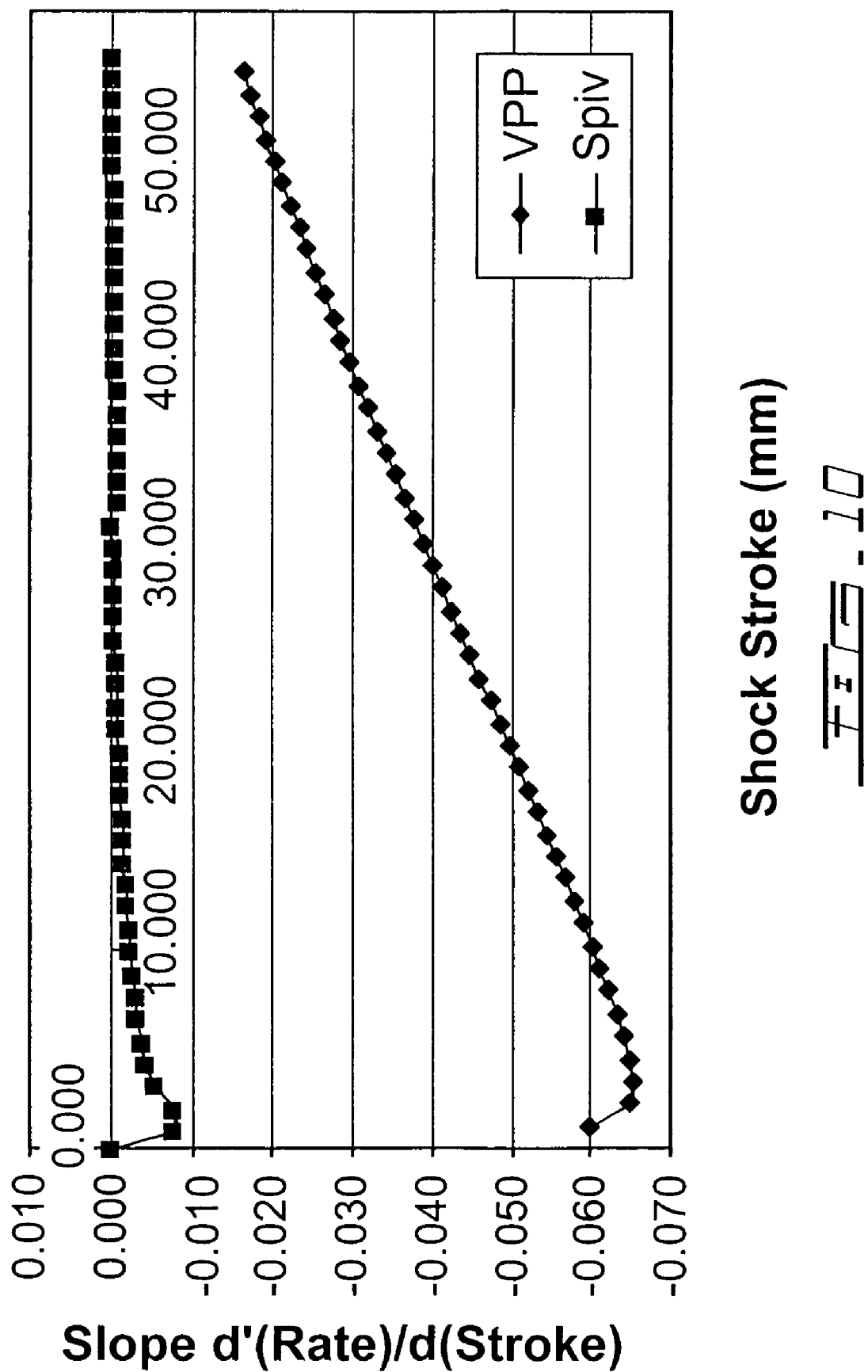
FIG. 10 is a graph plotting the first derivative of the curves of FIG. 9.

Suspension systems which allow for a shock rate that is said to be fully rising are particularly suitable for high speed and hard compression styles of riding, while helping to minimize exposure of the bicycle to high amplitude fatigue cycles. Such a full rising shock rate effectively means that the rear wheel moves in incrementally smaller distances for each incremental shock stroke, as the rear wheel moves from a fully extended position to a fully compressed position. It should be noted, however that the shock rate is an inherent characteristic of any suspension design, which is generally independent of the shock rate ratio for the specific shock absorber itself. As such, an aggressively rising rate shock absorber can be used to compensate for a poorly designed suspension system which has itself an innate falling shock rate. FIG. 9 depicts a graph of the change in Shock Rate (R) versus Shock Stroke (mm) for both the single pivot rear wheel suspension system 14 and the VPP rear wheel suspension system 60. As can be seen from the graph of FIG. 9, the single pivot suspension system has a relatively level grade curve and therefore would allow for more rising rate than the VPP rear wheel suspension system with the same shock absorber. The four bar VPP suspension design however has a slightly falling shock rate, and therefore a shock absorber having itself a progressively rising rate should preferably be used with this design. FIG. 10 depicts a graph of the first derivative relationship (i.e. the slope) of the shock rate curves shown in FIG. 9. Thus, the graph of FIG. 10 depicts the speed at which the suspension rate changes over the entire range of suspension motion. It can therefore be seen that the relatively large slope of the VPP rear wheel suspension system 60 will result in relatively fast suspension rate change, while the first derivative shock rate curve for the single pivot suspension system is relatively constant and therefore the shock rate changes relatively slowly over the entire range of suspension motion.

Figure 11:
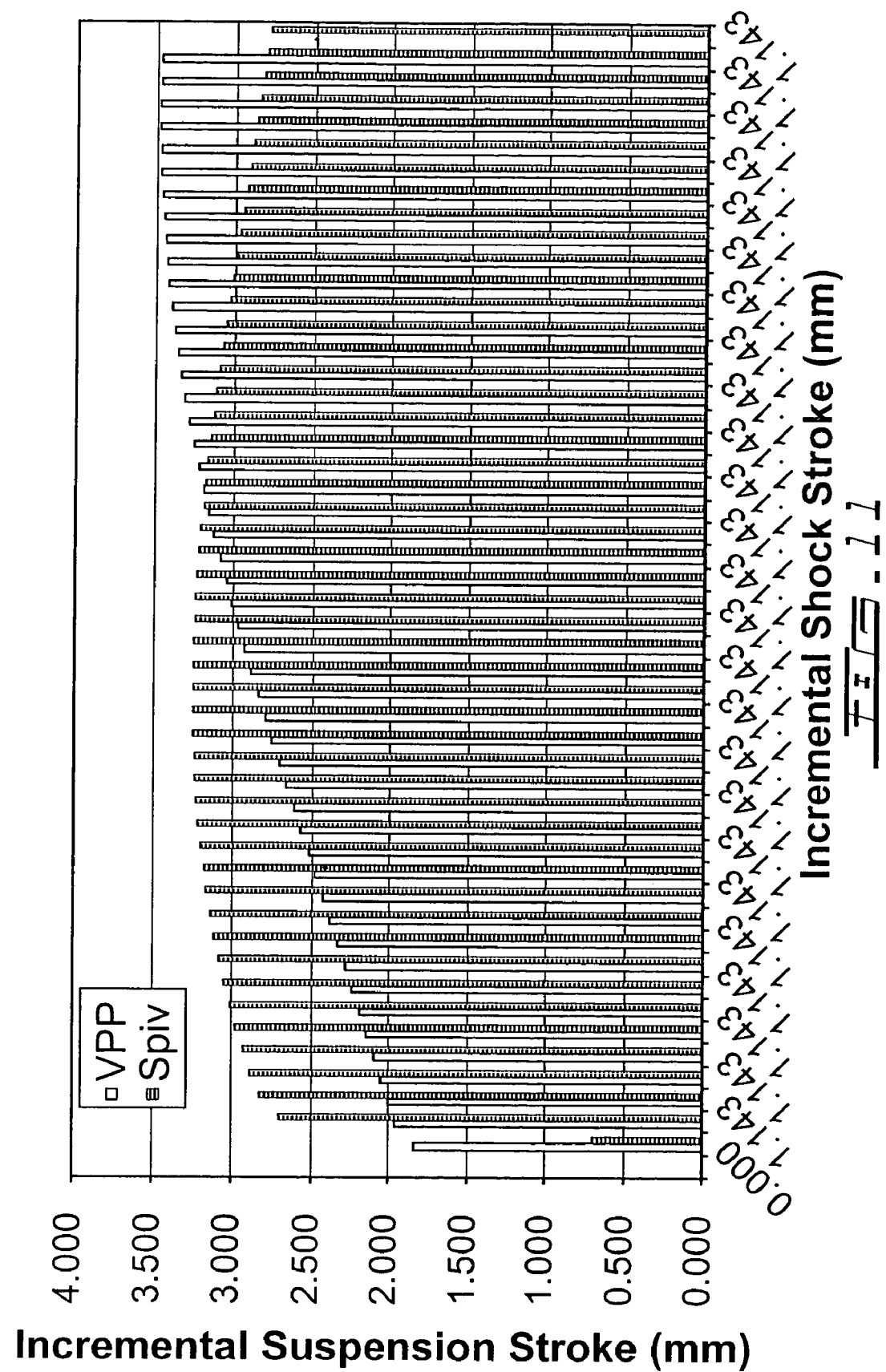
FIG. 11 is a bar graph of the inversed suspension shock rate curves of FIG. 9.

FIG. 11 depicts a bar graph of the inversed shock rate curve. The inversed shock rate is equal to suspension travel divided by shock rate. From the graph of FIG. 11 it can be seen that for the VPP suspension system, for each incremental shock stroke the suspension moves an incrementally bigger distance as the suspension travels from fully extended to fully compressed. The fixed single pivot rear wheel suspension system, on the other hand, behaves in an opposite fashion. Through the first portion of travel, each incremental shock stroke produces an incremental larger suspension movement only until the suspension has reached approximately half of its total travel distance, at which point each incremental shock stroke produces an incrementally smaller suspension movement.

The embodiments of the invention described above are intended to be exemplary only. The scope of the invention is therefore intended to be limited solely by the scope of the appended claims.

The invention claimed is:

1. A rear wheel suspension system for a bicycle having a frame with a bottom bracket, a seat tube, a top tube and a down tube, the suspension system comprising:

upper and lower pivots adapted to be fixed to said frame at two spaced apart points thereon, said upper pivot being disposed on said seat tube rearward of a first reference axis extending between said bottom bracket and an intersection between said seat tube and said top tube, said lower pivot being disposed proximate said bottom bracket;

a first link member having a first end pivotally connected to said upper pivot and a displaceable second end pivotable about said upper pivot;

a swing-arm having a forward end pivotally connected with said lower pivot directly to said frame, said swing-arm having a wheel mounting bracket at a rear end thereof for receiving a rear wheel axle such that said rear wheel axle pivots about said lower pivot with a constant radius of rotation, said swing-arm being pivotally connected with said first link member via an intermediate lower link member having a forward end pivotally connected to said first link member at a point thereon intermediate said first and second ends, the intermediate lower link member having a rearward end pivotally connected to said swing-arm, the swing-arm rotating in a direction opposite to that of the first link member as the rear wheel suspension system compresses; and a shock absorber having a first end pivotally connected to said displaceable second end of said first link member and a second end adapted for connection with said frame.

2. The rear wheel suspension system as defined in claim 1, wherein said shock absorber includes first and second ends, said first and second ends being disposed on opposed sides of a longitudinal central axis of said seat tube at least when said suspension system is in an un-compressed position.

3. A rear wheel suspension system for a bicycle having a frame with a bottom bracket, a seat tube, a top tube and a down tube, the suspension system comprising:
  upper and lower pivots adapted to be fixed to said frame at two spaced apart points thereon, said upper pivot being disposed on said seat tube rearward of a first reference axis extending between said bottom bracket and an intersection between said seat tube and said top tube, said lower pivot being disposed proximate said bottom bracket;
  a first link member having a first end pivotally connected to said upper pivot and a displaceable second end pivotable about said upper pivot;
  a swing-arm having a forward end pivotally connected with said lower pivot, said swing-arm having a wheel mounting bracket at a rear end thereof for receiving a rear wheel axle, said swing-arm being pivotally connected with said first link member at a point thereon intermediate said first and second ends;
  a shock absorber having a first end pivotally connected to said displaceable second end of said first link member and a second end adapted for connection with said frame; and
  wherein said first link member rotates in a direction opposite to the rotation of said swing-arm as said suspension system compresses.

4. A bicycle frame set comprising:
  a main frame including at least a seat tube, a top tube, a head tube, and a down tube having a bottom bracket affixed thereto; and
  a rear wheel suspension system pivotally attached to said main frame at two spaced apart locations, said rear wheel suspension system comprising:
    a first link member having a first end pivotally connected to said seat tube of said main frame at a link pivot point located at least rearward of a first reference axis extending through said bottom bracket and an intersection of said seat tube and said top tube, said first link member having a displaceable second end pivotable about said link pivot point;
    a swing-arm having a forward end pivotally interconnected with said main frame proximate said bottom bracket thereof at a lower pivot point, and a rearward end thereof having a mounting member adapted for engaging a rear wheel axle thereto, said swing-arm being pivotally connected with said first link member at a point thereon intermediate said first and second ends; and
    a shock absorber affixed between said main frame and said second end of said first link member, wherein said first link member rotates in a direction opposite to the rotation of said swing-arm as said rear wheel suspension system compresses.

5. The bicycle frame set as defined in claim 4, wherein said shock absorber is connected to said down tube of said main frame.

6. The bicycle frame set as defined in claim 5, wherein said down tube has a length L defined between said bottom bracket and an intersection of said down tube and at least one of said top tube and said head tube, and wherein said shock absorber is connected to said down tube a distance less than 0.5 L from said bottom bracket.

7. The bicycle frame set as defined in claim 4, wherein said shock absorber includes first and second ends, said first and second ends being disposed on opposed sides of a longitudinal central axis of said seat tube.

8. The bicycle frame set as defined in claim 7, wherein said seat tube is discontinuous and has a lower remote end, an opening being defined below said lower end and aligned with said longitudinal central axis of said seat tube.

9. The bicycle frame set as defined in claim 8, wherein said shock absorber extends through said opening.

10. The bicycle frame set as defined in claim 9, wherein at least one structural support member links said seat tube and said down tube, said structural support member being laterally offset from said opening.

11. The bicycle frame set as defined in claim 4, wherein said forward end of said swing-arm is pivotally connected to said frame at a fixed pivot point thereon, such that said rear wheel axle mounted to said rearward end of said swing-arm pivots about said fixed pivot point with a constant radius of rotation.

12. The bicycle frame set as defined in claim 11, wherein said fixed pivot point is disposed immediately above said bottom bracket.

13. The bicycle frame set as defined in claim 11, wherein said swing-arm is pivotally connected with said first link member via an intermediate lower link member.

14. The bicycle frame set as defined in claim 13, wherein said lower link member has a forward end pivotally connected to said first link member at said point thereon intermediate said first and second ends and a rearward end pivotally connected to said swing-arm.

15. The bicycle frame set as defined in claim 4, wherein said swing-arm is interconnected with said main frame via an intermediate second link member which is pivotally connected to each of said main frame and said swing-arm.

16. The bicycle frame set as defined in claim 15, wherein said swing-arm has a variable pivot point relative to said main frame as said rear wheel suspension system is displaced.

17. The bicycle frame set as defined in claim 16, wherein said rear wheel axle engaged to said swing-arm is pivotable relative to said main frame about a discrete instantaneous center of rotation at each point of travel of said rear wheel axle, said instantaneous centers of rotation defining a quadratic path corresponding to a travel path of said rear wheel axle.

18. The bicycle frame set as defined in claim 17, wherein a rate of change of a distance between said rear wheel axle mounted to said swing-arm and said bottom bracket of said main frame is variable, said rate of change being positive for all points of said rear wheel axle along said travel path thereof.

19. The bicycle frame set as defined in claim 4, wherein said link pivot point between said first link member and said seat tube of said main frame is located rearward of a second reference axis extending through said lower pivot point and a center of said bottom bracket.

20. The rear wheel suspension system as defined in claim 1, wherein the upper pivot is located rearward of a second reference axis extending through said lower pivot and a center of said bottom bracket.

21. The rear wheel suspension system as defined in claim 3, wherein the upper pivot is located rearward of a second reference axis extending through said lower pivot and a center of said bottom bracket.

* * * * *

US007216883C1

(12) EX PARTE REEXAMINATION CERTIFICATE (8885th)
United States Patent
O'Connor

(10) Number: US 7,216,883 C1
(45) Certificate Issued: Mar. 6, 2012

(54) BICYCLE WITH REAR SUSPENSION

(75) Inventor: D'Arcy O'Connor, Vancouver (CA)

(73) Assignee: Rocky Mountain Bicycles-a division of Procycle Group Inc., Delta (CA)

Reexamination Request:
No. 90/011,733, Jul. 26, 2011

Reexamination Certificate for:
Patent No.: 7,216,883
Issued: May 15, 2007
Appl. No.: 11/069,568
Filed: Mar. 2, 2005

(51) Int. Cl.
B62K 19/30 (2006.01)

(52) U.S. Cl. .................. 280/284; 280/275; 280/283
(58) Field of Classification Search .................. None
See application file for complete search history.

(56) References Cited

To view the complete listing of prior art documents cited during the proceeding for Reexamination Control Number 90/011,733, please refer to the USPTO's public Patent Application Information Retrieval (PAIR) system under the Display References tab.

Primary Examiner — Russell Stormer

(57) ABSTRACT

A bicycle frame set comprising a main frame and a rear wheel suspension system. The rear wheel suspension system comprises a first link member with an upper end pivotally connected to a seat tube of the main frame at a link pivot point located rearward of an axis extending between a bottom bracket of the main frame and an intersection of the seat tube and a top tube of the main frame. The first link member has a displaceable lower end pivotable about the link pivot point. The swing-arm is pivotally interconnected with the main frame proximate the bottom bracket and has a rearward end adapted to engage a rear wheel axle. The swing-arm is pivotally connected with the first link member at a point thereon intermediate the upper and lower ends. A shock absorber is affixed between the main frame and the lower end of the first link member.

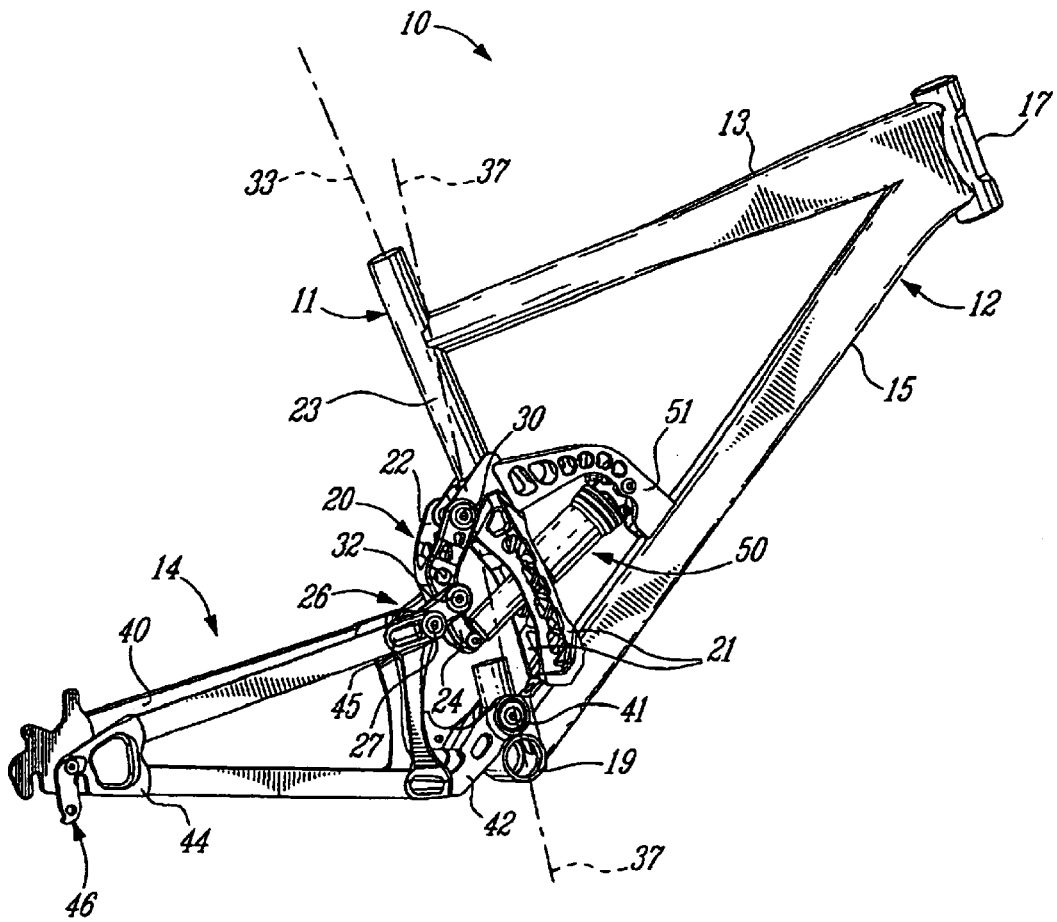

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-15 is confirmed.

New claims 22-27 are added and determined to be patentable.

Claims 16-21 were not reexamined.

*22. The rear wheel suspension system as defined in claim 1, wherein said first end and said second end of said shock absorber are disposed on opposed sides of the first reference axis extending between said bottom bracket and the intersection between said seat tube and said top tube, at least when said suspension system is in an un-compressed position.*

*23. The rear wheel suspension system as defined in claim 1, wherein said first end and said second end of said shock absorber are disposed on opposed sides of a second reference axis extending through said lower pivot and a center of said bottom bracket, at least when said suspension system is in an un-compressed position.*

*24. The rear wheel suspension system as defined in claim 3, wherein said first end and said second end of said shock absorber are disposed on opposed sides of said first reference axis extending between said bottom bracket and the intersection between said seat tube and said top tube, at least when said suspension system is in an un-compressed position.*

*25. The rear wheel suspension system as defined in claim 3, wherein said first end and said second end of said shock absorber are disposed on opposed sides of a second reference axis extending through said lower pivot and a center of said bottom bracket, at least when said suspension system is in an un-compressed position.*

*26. The bicycle frame set as defined in claim 4, wherein said shock absorber includes first and second ends, said first and second ends being disposed on opposed sides of said first reference axis extending between said bottom bracket and the intersection between said seat tube and said top tube, at least when said suspension system is in an un-compressed position.*

*27. The bicycle frame set as defined in claim 4, wherein said shock absorber includes first and second ends, said first and second ends being disposed on opposed sides of a second reference axis extending through said lower pivot and a center of said bottom bracket, at least when said suspension system is in an un-compressed position.*

* * * * *